United States Patent
McCurrie

(10) Patent No.: US 11,993,291 B2
(45) Date of Patent: May 28, 2024

(54) NEURAL NETWORKS FOR NAVIGATION OF AUTONOMOUS VEHICLES BASED UPON PREDICTED HUMAN INTENTS

(71) Applicant: Perceptive Automata, Inc., Boston, MA (US)

(72) Inventor: Mel McCurrie, Cambridge, MA (US)

(73) Assignee: Perceptive Automata, Inc., Boston, MA (US)

( * ) Notice: Subject to any disclaimer, the term of this patent is extended or adjusted under 35 U.S.C. 154(b) by 423 days.

(21) Appl. No.: 17/071,115

(22) Filed: Oct. 15, 2020

(65) Prior Publication Data

US 2021/0114627 A1 Apr. 22, 2021

Related U.S. Application Data

(60) Provisional application No. 62/916,727, filed on Oct. 17, 2019.

(51) Int. Cl.
*B60W 60/00* (2020.01)
*G06N 3/045* (2023.01)
(Continued)

(52) U.S. Cl.
CPC .. *B60W 60/00276* (2020.02); *B60W 60/0027* (2020.02); *G06N 3/045* (2023.01);
(Continued)

(58) Field of Classification Search
CPC ....... B60W 60/0027; B60W 2554/402; B60W 2554/4041; B60W 2554/4045;
(Continued)

(56) References Cited

U.S. PATENT DOCUMENTS 7,269,516 B2 9/2007 Brunner et al.
8,175,333 B2 5/2012 Eaton et al.
(Continued)

FOREIGN PATENT DOCUMENTS

JP 4420512 B2 * 2/2010 ......... G06K 9/00335

OTHER PUBLICATIONS

Saleh et al.; Real-time Intent Prediction of Pedestrians for Autonomous Ground Vehicles via Spatio-Temporal DenseNet; 2019 International Conference on Robotics and Automation (ICRA) Palais des congres de Montreal, Montreal, Canada, May 20-24, 2019 (Year: 2019).*

Ahmed et al.; Pedestrian and Cyclist Detection and Intent Estimation for Autonomous Vehicles: A Survey; Appl. Sci. 2019, 9, 2335; doi: 10.3390/app9112335; Jun. 2019 (Year: 2019).*

(Continued)

*Primary Examiner* — Michael J Zanelli
(74) *Attorney, Agent, or Firm* — Fenwick & West LLP

(57) ABSTRACT

A system uses neural networks to determine intents of traffic entities (e.g., pedestrians, bicycles, vehicles) in an environment surrounding a vehicle (e.g., an autonomous vehicle) and generates commands to control the vehicle based on the determined intents. The system receives images of the environment captured by sensors on the vehicle, and processes the images using neural network models to determine overall intents or predicted actions of the one or more traffic entities within the images. The system generates commands to control the vehicle based on the determined overall intents of the traffic entities.

18 Claims, 9 Drawing Sheets

(51) Int. Cl.
  *G06V 10/20* (2022.01)
  *G06V 10/44* (2022.01)
  *G06V 10/82* (2022.01)
  *G06V 20/58* (2022.01)
  *G06V 40/10* (2022.01)
(52) U.S. Cl.
  CPC ............ *G06V 10/255* (2022.01); *G06V 10/82* (2022.01); *G06V 20/58* (2022.01); *G06V 20/584* (2022.01); *G06V 40/103* (2022.01); *B60W 2420/403* (2013.01); *B60W 2554/402* (2020.02); *B60W 2554/4041* (2020.02); *B60W 2554/4045* (2020.02); *G06V 10/454* (2022.01)
(58) Field of Classification Search
  CPC ....... B60W 2420/42; B60W 60/00276; B60W 2554/4026; B60W 2554/4029; B60W 2554/4049; B60W 2556/20; G06V 20/58; G06V 10/255; G06V 10/82; G06V 10/454; G06V 20/584; G06V 40/103; G06N 3/0454; G06N 3/045; G06N 3/044; G06N 3/047; G06N 3/08
  See application file for complete search history.

(56) References Cited

U.S. PATENT DOCUMENTS

| | | | |
|---|---|---|---|
| 8,854,457 B2 | 10/2014 | De Vleeschouwer et al. | |
| 9,881,221 B2 | 1/2018 | Bala et al. | |
| 10,186,123 B2 | 1/2019 | Kanaujia et al. | |
| 11,348,246 B2* | 5/2022 | Phogat | G06T 11/60 |
| 2015/0213555 A1 | 7/2015 | Barfield, Jr. et al. | |
| 2016/0140438 A1* | 5/2016 | Yang | G06N 3/08 |
| | | | 706/12 |
| 2017/0153639 A1 | 6/2017 | Stein | |
| 2017/0270374 A1 | 9/2017 | Myers et al. | |
| 2018/0025632 A1* | 1/2018 | Breed | G09B 29/106 |
| | | | 701/93 |
| 2018/0146198 A1 | 5/2018 | Atluru et al. | |
| 2019/0176820 A1* | 6/2019 | Pindeus | G06V 20/58 |
| 2020/0239026 A1* | 7/2020 | Anthony | G06N 20/00 |

OTHER PUBLICATIONS

Girdhar, R. and Ramanan, D., "Attentional Pooling for Action Recognition," 31st Conference on Neural Information Processing Systems (NIPS 2017), 12 pages.
He, K., et al. "Mask R-CNN," Computer Vision and Pattern Recognition 1703.06870v3, Jan. 24, 2018, 12 pages.
International Search Report and Written Opinion, PCT Application No. PCT/US2018/063459, dated Feb. 7, 2019, 13 pages.
Karmarkar, T., "Regional Proposal network (RPN)—Backbone of Faster R-CNN," Aug. 18, 2018, 6 pages, [Online] [Retrieved Jan. 5, 2019], Retrieved from the internet <URL:https://medium.com/@tanaykarmarkar/region-proposal-network-rpn-bac>.
Kotseruba, I., et al., Joint Attention in Autonomous Driving (JADD), Robotics 1609.04741v5, Apr. 24, 2017, 10 pages.
Newell, A., et al., "Stacked Hourglass Networks for Human Pose Estimation," Computer Vision and Pattern Recognition 1603.06937v2, Jul. 26, 2016, 17 pages.
Ren, S. et al. "Faster R-CNN: Towards Real-Time Object Detection with Region Proposal Networks," Advances in Neural Information Processing Systems 28 (NIPS 2015), 9 pages.
Ren, S. et al. "Faster R-CNN: Towards Real-Time Object Detection with Region Proposal Networks," Computer Vision and Pattern Recognition 1506.01497v3, Jan. 6, 2016, 14 pages.
Santoro, A. et al., "A neural approach to relational reasoning," Jun. 6, 2017, 6 pages, [Online] [Retrieved Jan. 5, 2019], Retrieved from the internet <URL:https://deepmind.com/blog/neural-approach-relational-reasoning/>.
Santoro, A. et al., "A simple neural network module for relational reasoning," Computation and Language 1706.01427, Jun. 5, 2017, 16 pages.
Schneemann, F., et al., "Context-based Detection of Pedestrian Crossing Intention for Autonomous Driving in Urban Environments," 2016 IEEE/RSJ International Conference on Intelligent Robots and Systems (IROS), Oct. 2016, 6 pages.
Watters, N., et al., " Visual Interaction Networks," Computer Vision and Pattern Recognition 1706.01433v1, Jun. 5, 2017, 14 pages.
Zhao, H., et al., "Pyramid Scheme Parsing Network," Computer Vision and Pattern Recognition 1612.01105v2, Apr. 27, 2017, 11 pages.

* cited by examiner

NEURAL NETWORKS FOR NAVIGATION OF AUTONOMOUS VEHICLES BASED UPON PREDICTED HUMAN INTENTS

CROSS-REFERENCE TO RELATED APPLICATION

This application claims the benefit of U.S. Provisional Application No. 62/916,727 filed on Oct. 17, 2019, which is incorporated by reference in its entirety.

GOVERNMENT SUPPORT STATEMENT

This invention was made with government support under Award No. 1738479 awarded by National Science Foundation's Division of Industrial Innovation and Partnerships (IIP). The government has certain rights in the invention.

TECHNICAL FIELD

The present disclosure relates generally to use of machine learning based models for navigation of vehicles, and in particular, to predicting human interaction with vehicles for navigation of autonomous vehicles.

BACKGROUND

Human drivers have a natural ability to analyze their surroundings and predict behavior of traffic entities, for example, pedestrians, bicyclists, other vehicles driving in the traffic, and so on. However, computers and autonomous driving vehicles cannot adequately predict the behavior of traffic entities, especially in busy urban environments with lots of activity.

For example, autonomous driving vehicles rely on methods that make decisions on how to control the vehicles by predicting motion vectors of traffic entities near the vehicles. These methods may be implemented by collecting data of a traffic entity's current and past movements, determining a current motion vector of the traffic entity at a current time based on the current and past movements, and extrapolating a future motion vector representing the traffic entity's predicted motion at a future time based on the determined motion vector. However, the future motion vector may not be based on other observations besides the traffic entity's current and past movements, which lead to inferior results in predicting the traffic entity's future behavior.

SUMMARY

Embodiments relate to generating commands to control a vehicle based on attributes of traffic entities in an environment surrounding the vehicle, for example, intent of a pedestrian. A system receives a video of the environment in real-time to make behavior predictions of traffic entities based on input from cameras or other sensors installed on a vehicle. The vehicle may be an autonomous car, and these predictions can be used to make inferences about the intents of traffic entities such as cyclists, other motorists, and pedestrians to cross into the path of the vehicle, as well as whether the traffic entities are aware of the vehicle and its future path. The system may also predict whether the traffic entities would be surprised, welcoming, or unwelcoming if the vehicle were to engage in maneuvers which would take it into the path of another traffic entity (e.g., would an oncoming car yield if the vehicle were to turn left).

To determine the intents, the system applies a first neural network model to an image corresponding to a video frame to generate a feature map including a feature vector for each pixel in the image. Each feature vector may correspond to an intent associated with the pixel. After the feature map is determined, a second neural network model identifies objects captured in the image by performing object recognition on the image. The second neural network model generates a bounding box for each object around pixels representative of object. For each of the objects, the system determines an overall intent of the object representative of a predicted action to be performed by the object. The overall intent of an object may be influenced by intents of other objects in the image. For example, for a vehicle approaching a four-way stop at an intersection, the system may determine an overall intent for each of the other vehicles and pedestrians at the intersection based in part on relationships between the vehicle and other traffic entities in the environment. If a vehicle stops first at the intersection, the overall intent may indicate that the vehicle is predicted to proceed through the intersection before other vehicles. However, when a pedestrian begins to cross in front of the vehicle, the overall intent may be updated to indicate that the vehicle is predicted to yield to the pedestrian and another vehicle is predicted proceed through the intersection first. Using interlinked intents of different traffic entities allow the system to provide improved commands for controlling the vehicle that more closely resembles the way human drivers make judgements.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Embodiments of the disclosure predict hidden context associated with traffic entities (also referred to as "objects" herein) that determines behavior of these traffic entities in the traffic. A traffic entity represents an object in traffic, for example, a pedestrian, a bicycle, a vehicle, a delivery robot, and so on. Hidden context includes factors that affect the behavior of such traffic entities, for example, a state of mind of a pedestrian, a degree of awareness of the existence of the autonomous vehicle in the vicinity (for example, whether a bicyclist is aware of the existence of the autonomous vehicle in the proximity of the bicyclist), and so on. The system uses the hidden context to predict behavior of people near a vehicle in a way that more closely resembles how human drivers would judge behaviors of traffic entities.

In one embodiment, a group of users (e.g., human observers) view sample images of traffic entities (e.g., pedestrians, bicyclists, pets) that are located near streets and provide indicators or measurements representative of predicted behaviors of the traffic entities. These indicators or measurements are then used for training a machine learning based model that predicts how people will behave in a real-world context. In other words, after being trained based on the reactions of human observers to sample images in a training environment, the machine learning based model predicts behavior of traffic entities in a real-world environment, for example, actual pedestrian behavior in a real-world environment.

Figure 1A:
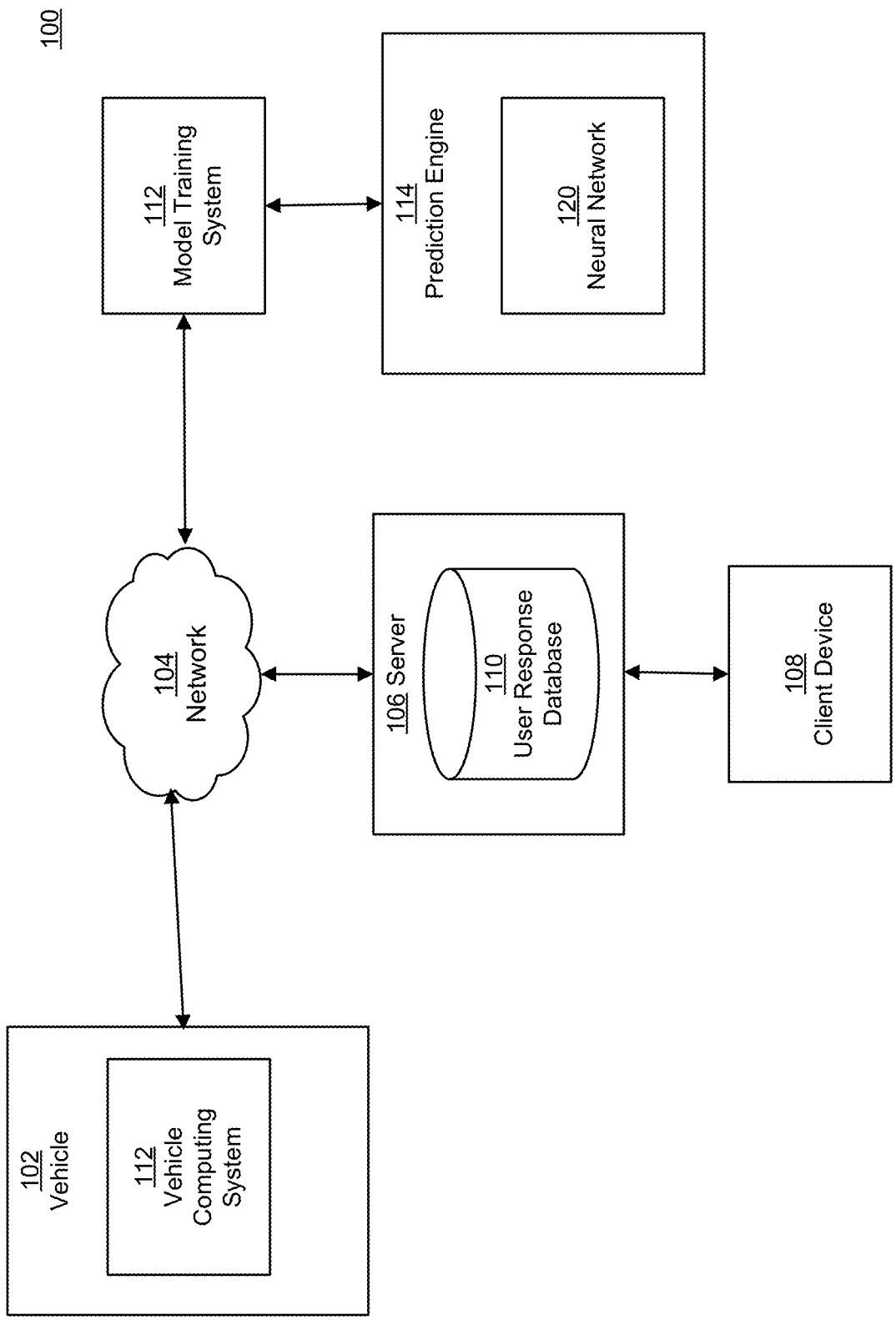
FIG. 1A is a system diagram of a networked system for predicting human behavior, according to some embodiments of the present disclosure.

A non-stationary object may also be referred to as a movable object. An object in the traffic or a traffic entity may also be referred to as an entity. Systems for predicting human interactions with vehicles are disclosed in U.S. patent application Ser. No. 15/830,549, filed on Dec. 4, 2017 which is incorporated herein by reference in its entirety.
System Environment FIG. 1A is a system diagram of a networked system 100 for predicting human behavior, according to some embodiments of the present disclosure. The system 100 includes a vehicle 102, a network 104, a server 106, a user response database 110, a user terminal 108, a model training system 112 and a prediction engine 114. In alternative configurations, different and/or additional components may be included in the system 100. The vehicle 102, the server 106, and the model training system 112 may communicate with each other via the network 104.

The vehicle 102 can be any type of manual or motorized vehicle such as a car, a bus, a train, a scooter, or a bicycle. As described in more detail below, the vehicle 102 can include sensors for monitoring the environment surrounding the vehicle. In one implementation, the sensors can include one or more cameras affixed to any portion of the vehicle for capturing a video of traffic entities near the vehicle. The sensors may also include radar sensors, light detection and ranging (LIDAR) sensors, ultrasonic sensors, and other suitable types of sensors for determining conditions of the environment.

The network 104 can be any wired and/or wireless network capable of receiving sensor data collected by the vehicle 102 and distributing it to the server 106, the model training system 112, and, through the model training system 112, the prediction engine 114. In one embodiment, the network 104 uses standard communications technologies and/or protocols. For example, the network 104 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 104 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 104 may be represented using any suitable format, such as hypertext markup language (HTML) or extensible markup language (XML). In some embodiments, all or some of the communication links of the network 104 may be encrypted using any suitable technique or techniques.

The server 106 can be any type of computer system capable of (1) hosting information (such as image, video and text information) and delivering it to a user terminal (such as client device 108), (2) recording responses of multiple users (or human observers) to the information, and (3) delivering such information and accompanying responses (such as responses input via client device 108) back to the network 104.

The client device 108 is a computing device capable of receiving user input as well as transmitting and/or data from the server 106. In one embodiment, the client device 108 is a conventional computer system, such as a desktop or a laptop computer. Alternatively, the client device 108 may be a device having computer functionality, such as a personal digital assistant (PDA), a mobile telephone, a smartphone, or another suitable device. The client device 108 is configured to communicate with the server 106 via the network 120. In one embodiment, the client device 108 executes an application allowing a user of the client device 108 to interact with the server 106. For example, the client device 108 executes a browser application to enable interaction between the client device 108 and the server 106 via the network 120. In another embodiment, the client device 108 interacts with the server 106 through an application programming interface (API) running on a native operating system of the client device 108, such as IOS® or ANDROID™.

The user response database 110 can be any type of database or data storage system capable of storing the image, video, and text information and associated user responses and subsequently recalling them in response to a query from the model training system 112.

The model training system 112 can be implemented in any type of computing system. In one embodiment, the model training system 112 receives the image, video, and/or text information and accompanying, or linked, user responses from the user response database 110 over the network 104. In some embodiments, the text information are discrete values or free text responses provided by users associated with client devices 108. The model training system 112 can use images, video segments and text segments as training examples to train an algorithm, and can create labels from the accompanying user responses based on the trained algorithm. These labels indicate how the algorithm predicts the behavior of the traffic entities in the associated image, video, and/or text segments. After the labels are created, the model training system 112 can transmit them to the prediction engine 144.

The prediction engine 114 can be implemented in any computing system. In an illustrative example, the prediction engine 114 includes a process that executes a model that has been trained by the model training system 112. This process predicts labels for a new (e.g., an actual "real-world") image, video, and/or text segment based on the labels and associated image, video, and/or text segments that it received from the model training system 112. In some embodiments, these labels represent aggregate or summary information about the responses of a large number of users (or human observers) presented with similar image, video, or text segments while the algorithm was being trained.

In an embodiment, the prediction engine 114 uses machine learning based models for predicting hidden context values associated with traffic entities. In an embodiment, the machine learning based model is a neural network 120 configured to receive an encoding of an image or a video of a traffic entity as input and predict hidden context associated with the traffic entity. Examples of traffic entities include pedestrians, bicyclists, or other vehicles. Examples of hidden context include, awareness of a bicyclist that a particular vehicle is driving close to the bicyclist, and intent of a pedestrian, for example, intent to cross a street, intent to continue walking along a sidewalk, and so on.

Figure 1B:
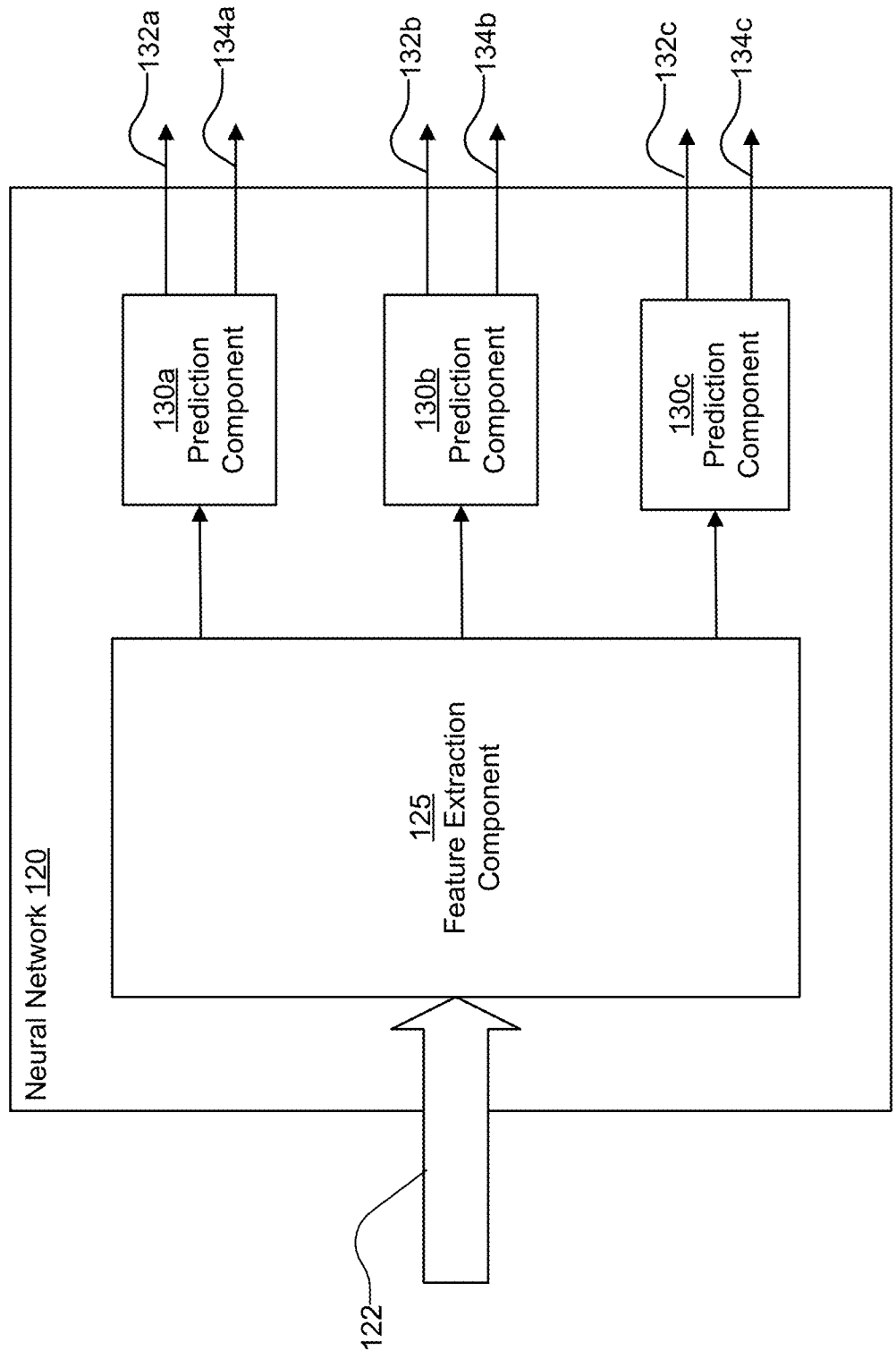
FIG. 1B is a system diagram of a neural network used to predict hidden context associated with traffic entities, according to some embodiments of the disclosure.

FIG. 1B is a system diagram of a neural network 120 used to predict hidden context associated with traffic entities, according to some embodiments of the disclosure. The neural network 120 is a deep neural network comprising a plurality of layers of nodes. The layers of the neural network comprise an input layer that receives the input values, an output layer that outputs the result of the neural network and one or more hidden layers. Each hidden layer receives input from a previous layer and generates values that are provided as input to a subsequent layer.

The neural network 120 receives an encoding of an image or video as input 122. The neural network 120 is configured to predict estimates of measures of uncertainty for hidden context attributes, for example, state of mind of pedestrians or bicyclists. During a training phase, the input 122 comprises stored images or videos provided as training data of the neural network 120. An image may represent a video frame. Once the neural network 120 is trained, the neural network 120 may be deployed in a vehicle, for example, an autonomous vehicle. After being deployed, the input 122 is images or video frames captured by a vehicle as it moves.

The sensors of an autonomous vehicle capture sensor data representing a scene describing the traffic surrounding the autonomous vehicle. The traffic includes one or more traffic entities, for example, a pedestrian. The autonomous vehicle provides sensor data as input to the neural network 120, for example, video frames of videos captured by cameras of the autonomous vehicle. In an embodiment, the input to the neural network 120 is a portion of a video frame that represents a bounding box around a traffic entity, for example, a pedestrian. In an embodiment, the input to the neural network is a sequence of bounding boxes surrounding the traffic entity obtained from a sequence of video frames showing the traffic entity, for example, in a video of a pedestrian captured as the pedestrian walks on a street. The autonomous vehicle uses the results of the prediction components 130 to generate control signals for providing to the vehicle controls for example, accelerator, brakes, steering, and so on) for navigating the autonomous vehicle through traffic.

The neural network 120 may comprise components including a feature extraction component 125 and a plurality of prediction components 130a, 130b, 130c, and so on. In an embodiment, the neural network 120 is a multi-task neural network configured to predict a plurality of output values representing different hidden context attributes. A multi-task neural network provides efficiency in training the model since the same model is able to predict multiple values. Accordingly, the process of training of the neural network as well as execution of the trained neural network is efficient in terms of performance. The neural network 120 may include a feature extraction component 125 that identifies features associated traffic entities captured in the input 122. In some embodiments, the feature extraction component 125 may identify the traffic entities using, for example, one or more edge detection, deep learning, Hough transform, Kalman filter, spatial filter, temporal filter, and other object recognition methods.

Each prediction component 130 predicts values for a particular hidden context attribute. For example, a first prediction component 130a may predict values describing intent of a first pedestrian to cross the street, a second prediction component 130b may predict values describing intent of a second pedestrian to continue walking down the sidewalk, and a third prediction component 130c may predict values describing awareness of a bicyclist of a vehicle following the bicyclist. Furthermore, the sharing of the feature extraction component 125 across different prediction components 130 such as 130a, 130b, 130c results in better training of the neural network.

Each prediction component outputs two values associated with a hidden context attribute: a predicted value 132 and an uncertainty value associated with the predicted value 132. In an embodiment, the predicted value 132 represents parameters describing statistical distribution of a hidden context attribute. In an embodiment, the predicted value 132 is a vector such that each value of the vector represents a likelihood that at an observer would assign a particular value to the hidden context attribute. For example, the hidden context attribute may have a plurality of possible values v1, v2, v3, and so on and the predicted value 132 is a vector comprising probability values p1, p2, p3, and so on such that p1 represents a likelihood that at an observer would assign value v1 to the hidden context attribute, p2 represents a likelihood that at an observer would assign value v2 to the hidden context attribute, p3 represents a likelihood that at an observer would assign value v3 to the hidden context attribute, and so on. In an embodiment, the neural network 120 is an LSTM (long short-term model).

In an embodiment, the neural network 120 is a probabilistic neural network that may generate different outputs for the same input if the neural network is executed repeatedly. However, the outputs generated have a particular statistical distribution, for example, mean and standard deviation. The statistical distribution is determined by parameters of the neural network that can be adjusted to generate different statistical distributions. In an embodiment, the feature extraction component generates features such that each feature value represents statistical distribution, for example, mean and standard deviation values. In an embodiment, the neural network 120 is a convolutional neural network.

In an embodiment, the neural network 120 generates uncertainty estimate values corresponding to each of the plurality of possible values of the hidden context attribute. For example, the hidden context attribute values may be classified using a plurality of bins, each bin representing a range (or set) of values. The neural network 120 generates uncertainty estimate values for each bin.

Figure 2A:
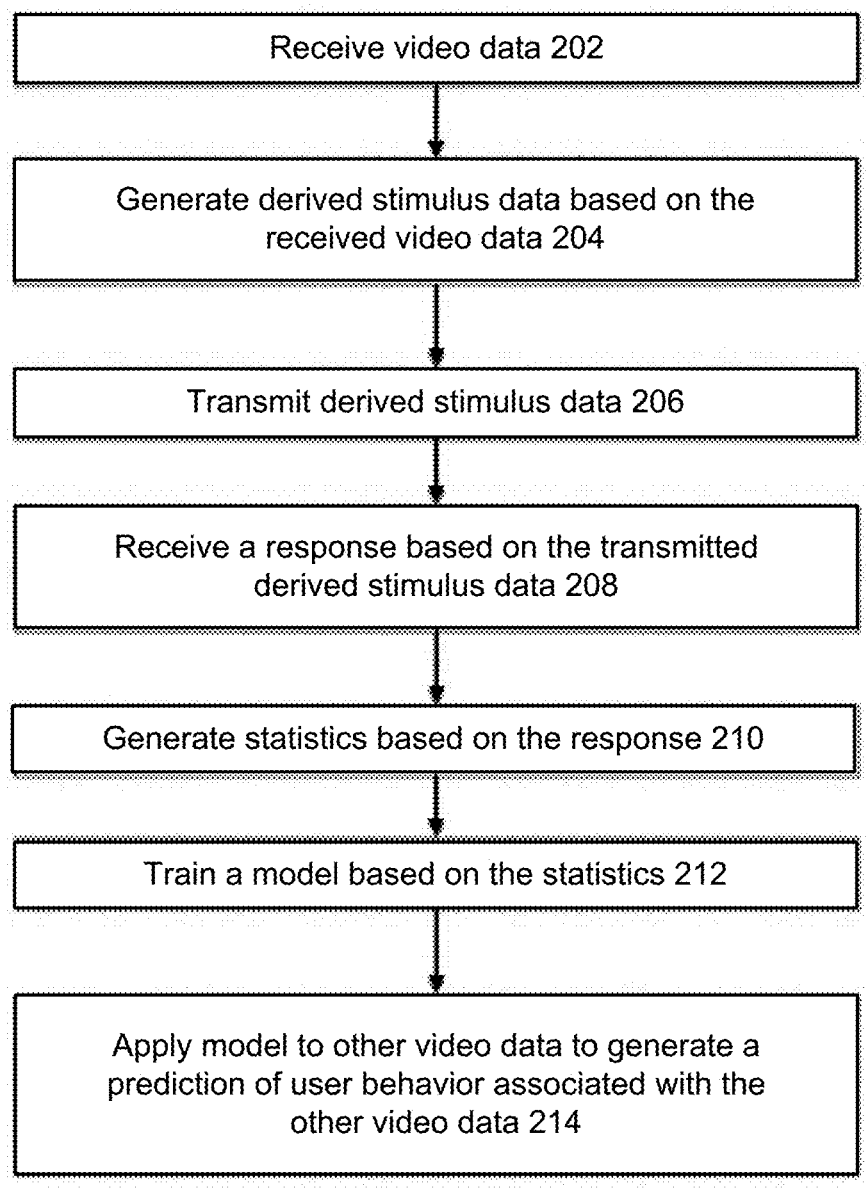
FIG. 2A is a flowchart showing a process of predicting human behavior, according to some embodiments of the present disclosure.

FIG. 2A is a flowchart showing a process of predicting human behavior, according to some embodiments of the present disclosure. In one implementation, video or other data is captured by a camera or sensor mounted on the vehicle 102. The camera or other sensor can be mounted in a fixed or temporary manner to the vehicle 102. The camera does not need to be mounted to an automobile, and could be mounted to another type of vehicle, such as a bicycle. As the vehicle travels along various streets, the camera or sensor captures still and/or moving images (or other sensor data) of pedestrians, bicycles, automobiles, etc. moving or being stationary on or near the streets. In step 202, this video or other data captured by the camera or other sensor is transmitted from the vehicle 102, over the network 104, and to the server 106 where it is stored.

Then, in step 204, video frames or segments are extracted from the stored video or other data and are used to create stimulus data including derived stimulus (or stimuli). In one implementation, the derived stimulus corresponds to a scene in which one or more humans are conducting activities (e.g., standing, walking, driving, riding a bicycle, etc.) beside or on a street and/or near a vehicle. As explained in more detail below for example in step 214, as part of the training process for the prediction algorithm, human observers view the derived stimulus and predict how they believe the humans shown in the derived stimulus will act. In yet a further implementation, after the video frames or segments are extracted from the stored data, the derived stimulus is generated by manipulating the pixels or equivalent array data acquired from the camera or other sensor in step 204, producing a new data file that conveys a portion of the information from the original video with certain aspects highlighted or obscured.

Figure 2B:
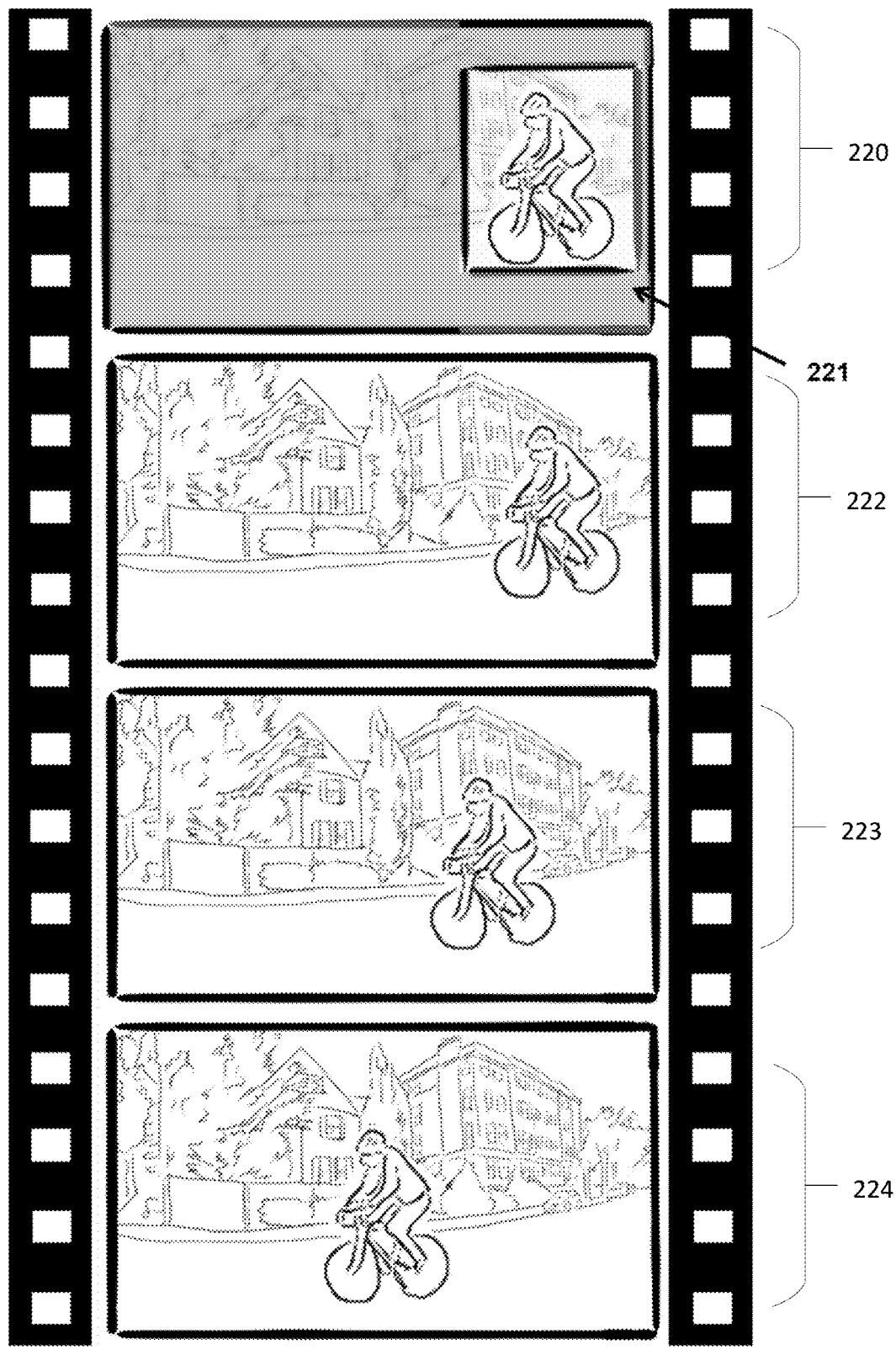
FIG. 2B shows an example of a derived stimulus, according to some embodiments of the present disclosure.

FIG. 2B shows an example of a derived stimulus, according to some embodiments of the present disclosure. As shown, video frames (or frames) 220, 222, 223, and 224, are extracted from a short segment of video. A copy of the first frame is made 220. On the copy of the first frame 220, a box 221 is drawn around the figure of interest, highlighting that figure. The copy of the first frame 220 and the three extracted frames 222, 223, and 224 are then recombined into a short video segment that loops. This encourages human observers to focus on a figure of interest in the video segment.

In step 206, the derived stimulus is transmitted from the server 106 and displayed to a large number of users (or human observers) on the user terminal 108 (or multiple terminals 108). The terminal(s) 108 prompt the human observers to predict how the people shown in the derived stimulus will act, and upon viewing the displayed stimulus, the observers input their responses corresponding to their predictions. For example, in the derived stimulus shown in FIG. 2B, the human observers may predict that the bicyclist will continue riding to the left in the figure. In other derived stimuli, the responses may predict whether a first person in the stimulus will cross the street, another person will remain standing on a street corner, and yet another person will change lanes on his or her bicycle. In an illustrative embodiment, the human observers may make a continuous or ordinal judgment about the state of mind or the predicted behavior of the people shown in the derived stimulus and record that judgment. For example, the human observers may select an appropriate icon displayed on the terminal(s) 108 by clicking a mouse or by pressing a key to indicate their judgment or prediction. The judgment or prediction may correspond to the human observers' assessment of the state of mind of the person in the derived stimulus or other awareness or intention that would be relevant to a hypothetical driver who sees the person in the derived stimulus while driving. In step 208, the derived stimulus and associated human observer responses are transmitted from the terminal(s) 108 to the server 106 and recorded in the user response database 110.

Referring back to FIG. 2A, in step 210, summary statistics are generated based on the user responses. For example, the statistics may characterize the aggregate responses of multiple human observers to a particular derived stimulus. For instance, if the derived stimulus shows a pedestrian walking on a sidewalk towards an intersection, the response can be categorized in terms of how many human observers believe that the pedestrian will stop upon reaching the intersection, continue walking straight across the intersection, turn a corner and continue walking along the sidewalk without crossing the intersection, etc. These summary statistics can characterize the human observer responses in terms of certain parameters associated with the statistics, such as a content of a response, a time associated with entering a response, and a position of an eye of a human observer associated with the response. The parameters can also be associated with a (1) central tendency, variance, skew, kurtosis, scale, or histogram. For example, the amount of time users took to input their responses can be characterized in terms of central tendency, variance, skew, kurtosis, scale, histogram. Also, the statistics can include a parameter that additionally or alternatively characterizes the movement of the human observers' eyes relative to a display when making the judgments in terms of central tendency, variance, skew, kurtosis, scale, histogram or two-dimensional distribution. In one embodiment, the statistics are stored in the user response database 110 with an index that identifies the raw video or sensor data from which the derived stimulus was generated. In a further embodiment, the statistics stored in the database 110 cover a large set of images of people on or near roads and are categorized in a number of different categories, such as pedestrian, driver, motorcyclist, bicyclist, scooter driver, self-balancing scooter rider, unicyclist, motorized wheelchair user, skateboarder, or others. Moreover, the statistics are respectively stored along with, or linked to, the images of the derived stimuli corresponding to the statistics.

In step 212, the stored statistics and corresponding images (e.g., the video frames or segments that were extracted from the video or other data (captured from the camera or sensor of the vehicle 202)) are sent over the network 104 to the model training system 112 and used to train a prediction algorithm. For example, the collection of images and statistics can be used to train a supervised learning algorithm, which can comprise a random forest regressor, a support vector regressor, a simple neural network, a deep convolutional neural network, a recurrent neural network, a long-short-term memory (LSTM) neural network with linear or nonlinear kernels that are two dimensional or three dimensional, or any other supervised learning algorithm which is able to take a collection of data labeled with continuous values and adapt its architecture in terms of weights, structure or other characteristics to minimize the deviation between its predicted label on a novel stimulus and the actual label collected on that stimulus using the same method as was used on the set of stimuli used to train that network. The model is given data which comprises some subset of the pixel data from the video frames that the summary statistics were generated from. In one implementation, this subset includes the pixel data contained in a box (such as the box 221 shown in FIG. 2B) drawn to contain the boundaries of the person, cyclist, motorist and vehicle, or other road user, including their mode of conveyance. In some other implementations, it also includes the entire pixel data from the rest of the image. In one of those implementations, that pixel data is selected according to criteria such as the salience of those features in terms of contrast, lighting, presence of edges, or color. In an additional implementation, the features can include descriptive meta-data about the images such as the dimensions and location of the bounding box, the shape of the bounding box or the change in size or position of the bounding box from one frame to the next.

In step 214, the prediction engine 114 uses the trained model from the model training system 112 to predict the actual, "real-world" or "live data" behavior of people on or near a road. In one embodiment, the prediction engine 114 receives "live data" that matches the format of the data used to train the trained model. For example, if the trained model was trained based on video data received from a camera on the vehicle 102, the "live data" that is input to the algorithm likewise is video data from the same or similar type camera. On the other hand, if the model was trained based on another type of sensor data received from another type of sensor on the vehicle 102, the "live data" that is input to the prediction engine 114 likewise is the other type of data from the same or similar sensor.

The trained model or algorithm makes a prediction of what a pedestrian or other person shown in the "live data" would do based on the summary statistics and/or training labels of one or more derived stimulus. The accuracy of the model is determined by having it make predictions of novel derived stimuli that were not part of the training images previously mentioned but which do have human ratings attached to them, such that the summary statistics on the novel images can be generated using the same method as was used to generate the summary statistics for the training data, but where the correlation between summary statistics and image data was not part of the model training process. The predictions produced by the trained model comprise a set of predictions of the state of mind of road users that can then be used to improve the performance of autonomous vehicles, robots, virtual agents, trucks, bicycles, or other systems that operate on roadways by allowing them to make judgments about the future behavior of road users based on their state of mind.

Figure 3:
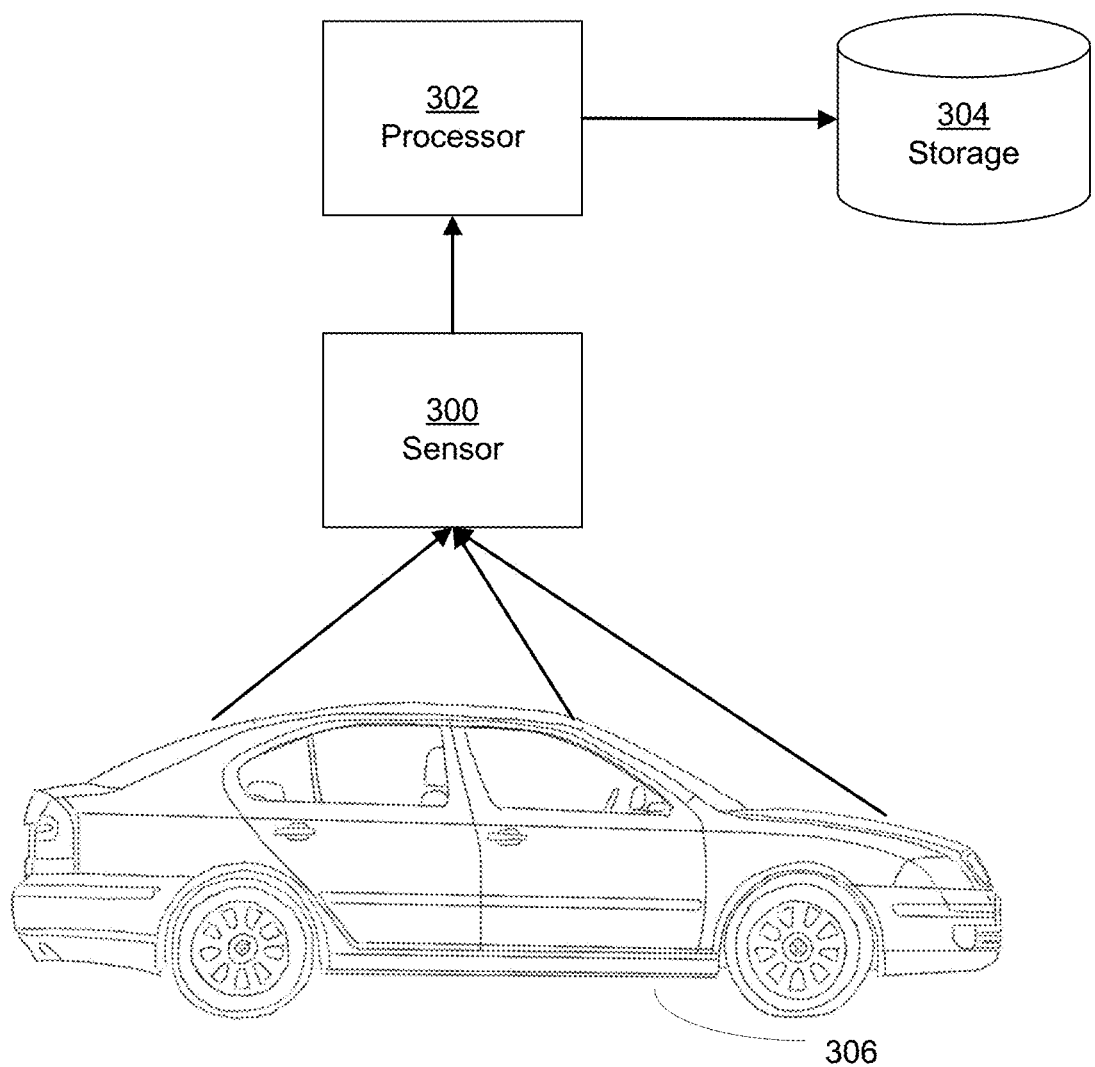
FIG. 3 is a system diagram showing a sensor system associated with a vehicle, according to some embodiments of the present disclosure.

FIG. 3 is a system diagram showing a sensor system associated with a vehicle, according to some embodiments of the present disclosure. FIG. 3 shows a vehicle 306 with arrows pointing to the locations of its sensors 300, a local processor and storage 302, and remote storage 304.

Data is collected from cameras or other sensors 300 including solid state Lidar, rotating Lidar, medium range radar, or others mounted on the car in either a fixed or temporary capacity and oriented such that they capture images of the road ahead, behind, and/or to the side of the car. In some embodiments, the sensor data is recorded on a physical storage medium (not shown) such as a compact flash drive, hard drive, solid state drive or dedicated data logger. In some embodiments, the sensors 300 and storage media are managed by the processor 302.

The sensor data can be transferred from the in-car data storage medium and processor 302 to another storage medium 304 which could include cloud-based, desktop, or hosted server storage products. In some embodiments, the sensor data can be stored as video, video segments, or video frames.

In some embodiments, data in the remote storage 304 also includes database tables associated with the sensor data. When sensor data is received, a row can be added to a database table that records information about the sensor data that was recorded, including where it was recorded, by whom, on what date, how long the segment is, where the physical files can be found either on the internet or on local storage, what the resolution of the sensor data is, what type of sensor it was recorded on, the position of the sensor, and other characteristics.

Figure 4:
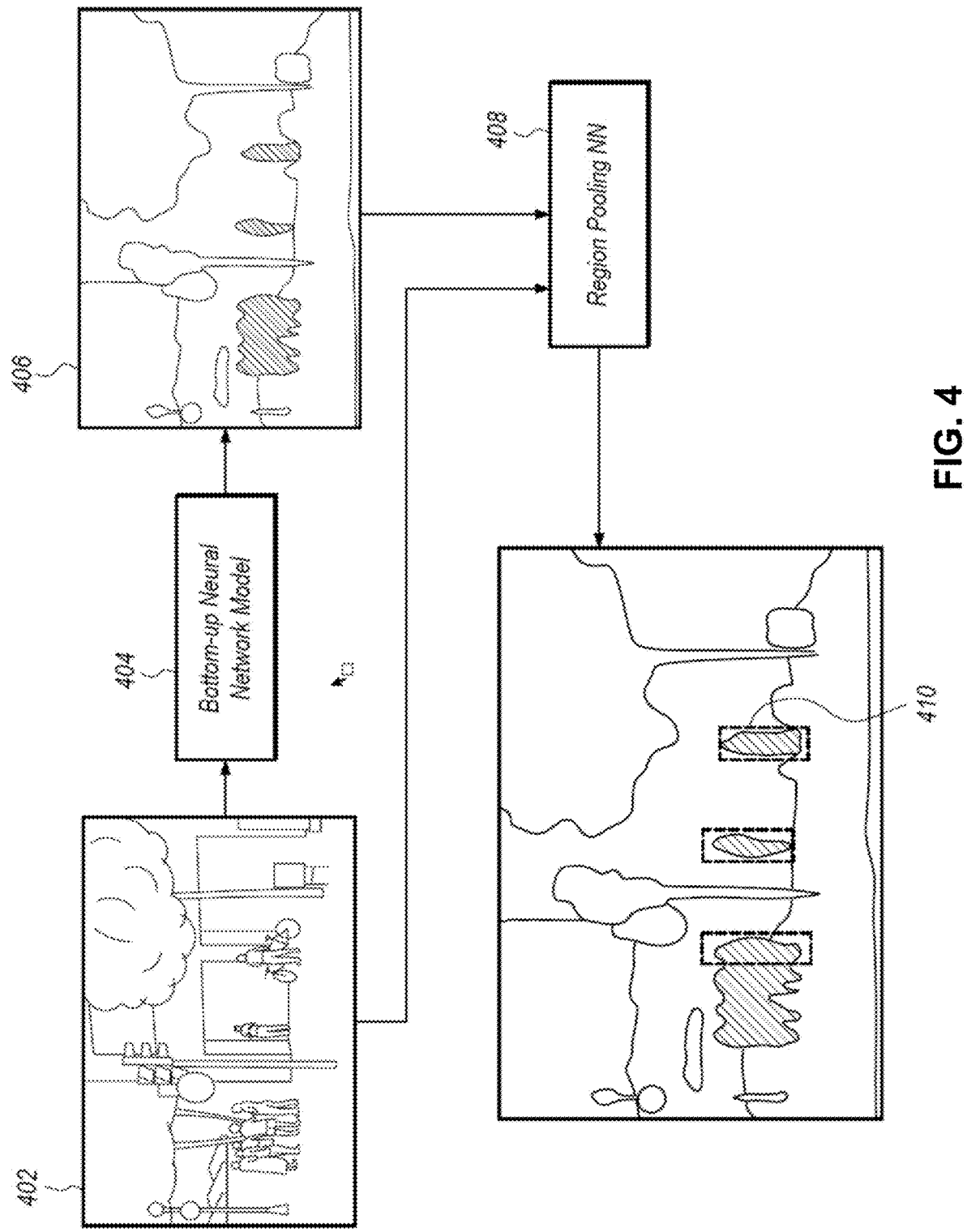
FIG. 4 is a diagram illustrating an example process of a sensor system associated with a vehicle analyzing received sensor data, according to some embodiments of the present disclosure.

FIG. 4 is a diagram illustrating how a sensor system of a vehicle (such as that illustrated in FIG. 3) analyzes received sensor data, in accordance with some embodiments. In some embodiments, the processor 302 of the sensor system receives sensor data generated by one or more sensors 300 including one or more images captured by cameras mounted on the vehicle, and accesses a plurality of models to determine intents of different regions within the received images and/or to identify objects within the received images for which intents can be determined.

In some embodiments, the sensor system may analyze the received images using (1) a bottom-up approach, (2) a top-down approach, or (3) a combination thereof. In a bottom-up approach, the sensor system determines a feature value for each pixel of the received image. The sensor system combines the feature value of groups of pixels to determine feature values of objects represented by the groups of pixels. On the other hand, in a top-down approach, the sensor system identifies regions of the image corresponding to particular objects, and determines a feature value for one or more of the identified objects. In some embodiments, the sensor system utilizes a bottom-up approach and a top-down approach sequentially, allowing the sensor system to identify regions of interest within the received images in constant time, and to analyze individual objects within the regions of interest.

The image 402 may correspond to a video frame captured by a camera or other sensor of the sensor system. In addition, although FIG. 4 illustrates the sensor system as receiving images as input, it is understood that in some embodiments, the received sensor data may include other types of data, such as depth data (e.g., obtain by LIDAR or other types of depth sensor). For example, received images may be combined with depth data to generate a three-dimensional model of one or more objects within the local area of the vehicle.

The received image 402 is processed by a first neural network model 404 (referred to as a bottom-up neural network model) to generate a feature map 406. The bottom-up neural network model 404 may correspond to any type of neural network model, such as a convolution neural network (CNN), a PSP network, an hourglass network (e.g., a stacked hourglass network), and/or the like. The bottom-up neural network model 404 generates the feature map 406 by determining, for each pixel of the image 402, a feature corresponding to the pixel. As used herein, a feature may comprise an array or vector of numbers indicating one or more characteristics of the pixel. In some embodiments, a feature of a pixel indicates an "intent" associated with the pixel.

An intent may indicate an expected action of an object associated with a pixel. For example, a particular pixel may be part of a person having an intent to cross the street, an intent to remain on the sidewalk, and/or the like. Intent may also indicate a level of awareness of the object associated with the pixel (e.g., whether the object is aware of the vehicle). For example, an object corresponding to a person may have an intent to cross the street but is unaware of the vehicle, have an intent to cross the street but having awareness of the vehicle, have an intent to not cross the street and being aware of the vehicle, etc. In some embodiments, the intent of a pixel may indicate one or more distributions of possible intents (e.g., intents to cross the street, awareness of the vehicle, etc.).

In some embodiments, the first neural network model 404 is trained to be able to associate a pixel with an intent based upon input generated by human observers on a set of training data, who are able to judge intent based upon whether the pixel is part of a human or an inanimate object, a pose and orientation of the human the pixel is a part of, presence or absence of other types of objects within the scene depicted by the image (e.g., a moving car, a stoplight, etc.), and/or the like. Inputs from multiple human evaluators may be used to generate one or more intent distributions for pixels or objects of the set of training data, which the bottom-up neural network model attempts to predict when analyzing the received image 402.

In some embodiments, a feature may further indicate a type of object a pixel is associated with (e.g., whether the pixel of the image is part of a person, a car, a tree, etc. that is depicted in the image), or a path of the pixel (e.g., whether the pixel is part of a depicted object that is moving, and if so, a direction of movement).

The feature map 406 indicates, for each pixel of the image 402, a feature vector associated with the pixel. For example, in FIG. 4, the feature map 406 is illustrated with different colors corresponding to different feature values, such that pixels of the image 402 having the same feature value are illustrated in the feature map 406 using the same color.

As described above, the first neural network model 404 analyzes the image 402 in a bottom-up manner by ascribing each pixel of the image 402 with an associated feature vector indicating one or more characteristics of the pixel. Because the first neural network model 404 analyzes each pixel of the received image 402, images data received from the sensors of the sensor system (assuming the same number of pixels for each image) can be processed in constant time. This allows for the sensor system to generate feature maps of frames of video data and a known and predictable rate.

However, because the feature map 406 only indicates feature vectors for individual pixels, the feature map 406 may not be able to distinguish between different objects in the scene. For example, a region of pixels within the image 402 may each be associated with a feature vector indicating that the pixel is part of a human having an intent to cross the street. However, the feature map 406 will not indicate whether the region of pixels corresponds to a single human or a group of humans. In some embodiments, the system tracks a particular object (e.g., a pedestrian) over multiple video frames. As such, the system distinguishes between individual objects within the image.

In some embodiments, the sensor system further comprises a second neural network model 408 (e.g., a region pooling neural network model) configured to analyze the received image 802 and the feature map 806 to determine regions of interest within the feature map 806, and identify individual objects of interest within the regions of interest.

For example, in some embodiments, the feature map 406 may indicate the presence of people in many different areas of the scene. However, in many cases, only a subset of those people are relevant for determining vehicle behavior. For instance, people within the scene that are in certain locations (e.g., at least a threshold distance away from the road) or are associated with certain intents (e.g., an intent to walk along the sidewalk) may not be relevant, and do not need to be considered for further analysis.

Figure 5:
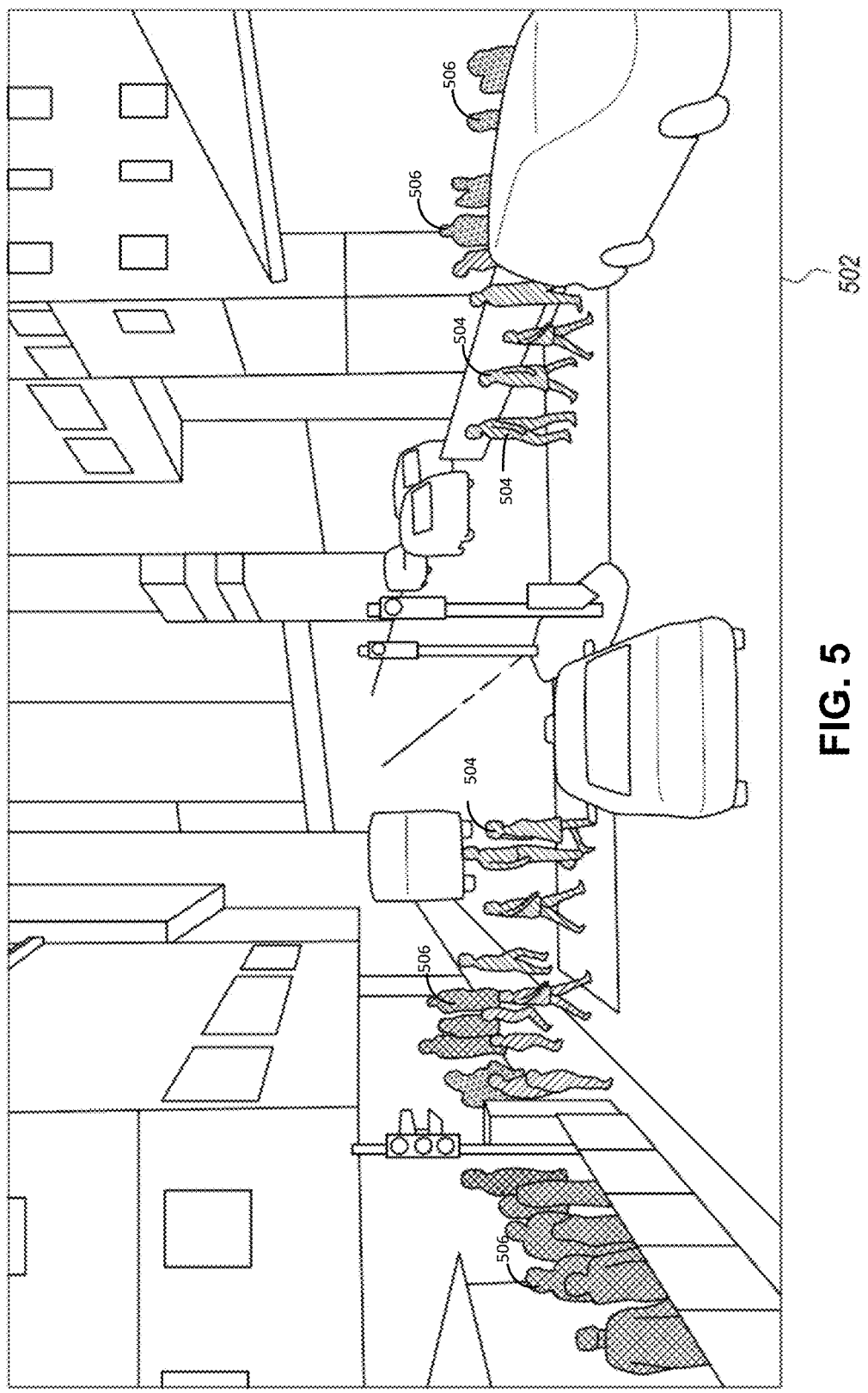
FIG. 5 illustrates an example of a feature map, in accordance with some embodiments of the present disclosure.

FIG. 5 illustrates another example of a feature map, in accordance with some embodiments. As illustrated in the feature map 502, a given scene may include pixels associated with people with different intents in different areas of the scene. For example, the feature map 502 illustrates certain pixels associated with a first group of people 504 walking along the sidewalk, while other pixels correspond to a second group of people 506 with other intents. In some embodiments, the region pooling neural network model 408 may consider only certain types of people to be relevant (e.g., first group of people 504 but not second group of people 506). As such, the region pooling neural network model 408 may filter out regions of the feature map 502 that are deemed to be irrelevant, and only needs to analyze regions of the feature map 502 that are relevant, potentially decreasing an amount of processing time needed to analyze the feature map 502.

The region pooling neural network model 408 receives the feature map and image, and generates one or more bounding boxes corresponding to objections within the regions of interest within the feature map. In some embodiments, the region pooling neural network model 408 performs object recognition using the received image 402 to generate one or more bounding boxes, each corresponding to an object depicted by the image 402 (e.g., a person). Each bounding box may be matched to a corresponding region of the feature map 406 to determine features that are within the bounding box. The feature vectors corresponding to the pixels within the bounding box are aggregated to generate an overall feature vector for the bounding box. In some embodiments, the overall feature vector is based upon an average of the feature vectors within the bounding box. In other embodiments, the overall feature vector may be based upon a most common feature vector within the bounding box.

In some embodiments, each bounding box 410 (e.g., as illustrated in FIG. 4) may be rectangular in shape. As such, a particular bounding box may encompass pixels of an image 402 that are associated with a particular object (e.g., a person) as well as pixels that are outside the object (e.g., background pixels, adjacent people, etc.). In some embodiments, certain feature vectors within the bounding box may be filtered out or discarded when determining the overall feature vector of the bounding box (e.g., outlier feature vectors), which may be done to eliminate feature vectors associated with other objects.

While FIG. 4 illustrates bounding boxes that are rectangular in shape, it is understood that in some embodiments, the region pooling neural network model 408 may generate bounding boxes of different shapes. For example, in some embodiments, the region pooling neural network model 408 uses object recognition techniques to identify an outline of an object, wherein the bounding box corresponds to the outline. As such, a number of feature vectors within the bounding box corresponding to other objects may be reduced.

By generating an overall feature vector for each bounding box, the intent of individual objects within the scene can be determined. In addition, because the region pooling neural network model 408 filters out regions of the feature map 406 determined to not be relevant, the region pooling neural network model 408 only needs to determine bounding boxes for relevant objects, and analyze the features (e.g., intent) of those objects. This can greatly reduce an amount of processing needed to be performed by the region pooling neural network model 408. For example, in cases where a scene contains a large number of people, the first neural network model 404 is able to generate feature maps for each image in constant time, allowing the region pooling neural network model 408 to eliminate regions of the feature map that do not contain relevant features, reducing the area of the images for which bounding boxes corresponding to individual objects are determined.

In some embodiments, by identifying individual objects within an image, the sensor system may be able to track the location and intent of specific objects over time. For example, the sensor system may analyze a series of images corresponding to different frames of video data over time to identify bounding boxes for individual objects in each image, and to determine correspondences between bounding boxes in different images that are associated with the same object, in order to analyze how the intent of the object changes over time. In some embodiments, the region pooling neural network model 408 may update an intent of an object based upon determined intents of the object in previous frames, a change in location or pose of the object from previous frames, or some combination thereof. For example, if the location of a particular person in a series of frames indicates that the person is moving towards the street at a particular speed, the determined feature vector for the person in a subsequent frame may indicate that the person's intent is likely that of wanting to cross the street.

Figure 6A:
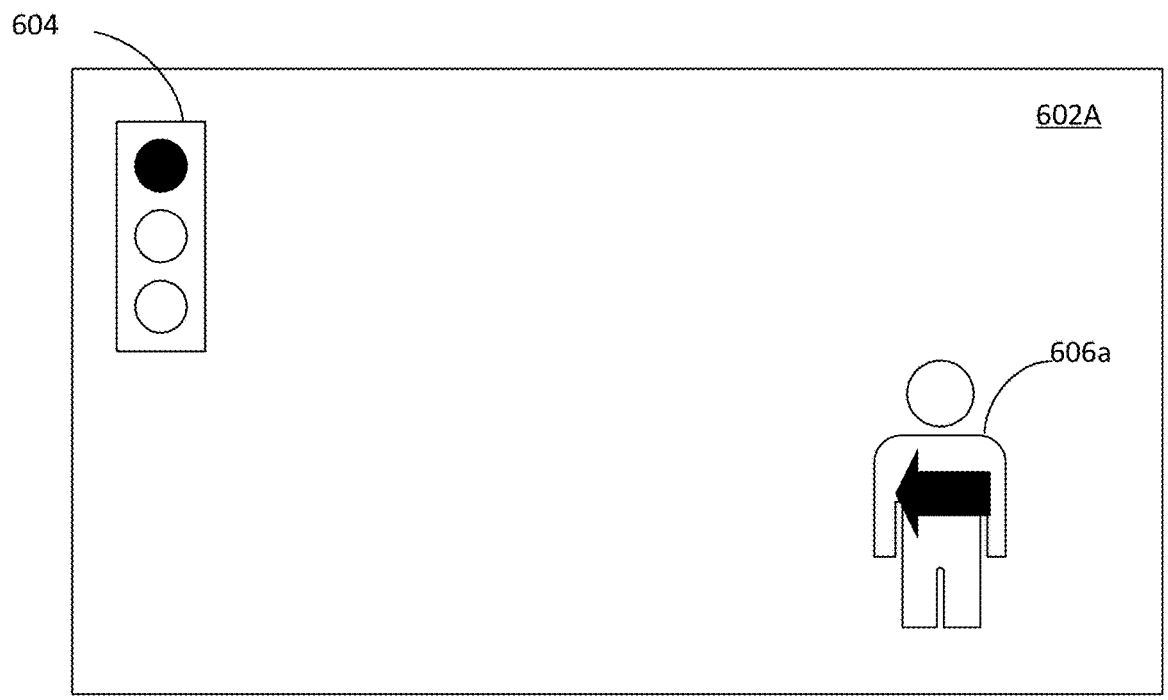
FIG. 6A illustrates a first example of determining intent of an object based on a global context of an image, in accordance with some embodiments of the present disclosure.
Figure 6B:
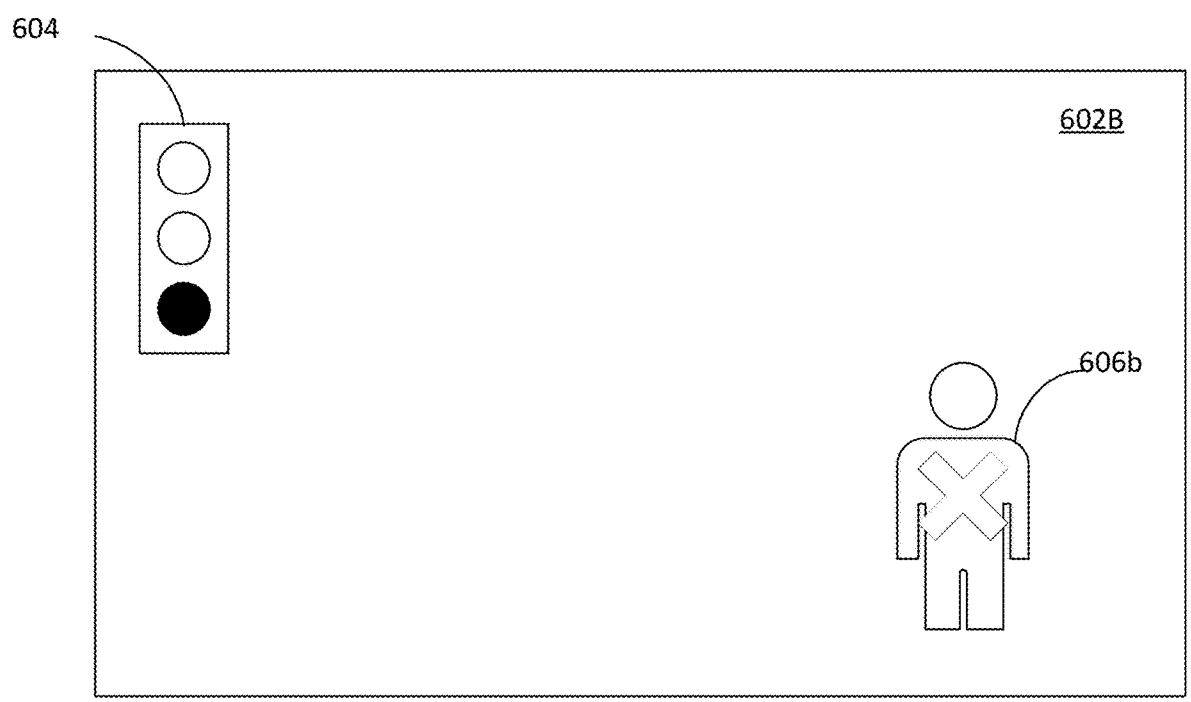
FIG. 6B illustrates a second example of determining intent of an object based on a global context of an image, in accordance with some embodiments of the present disclosure.

In some embodiments, the first neural network model 404 and the region pooling neural network model 408 may be trained to be able to determine intents of pixels or objects based upon relationships with other objects that are present or absence in the image 402 (referred to as the "global context" of the image). FIGS. 6A and 6B illustrates an example of how the intent of an object may be based upon a global context of an image, in accordance with some embodiments. FIG. 6A illustrates a first image having a first context (e.g., a stop light on red), while FIG. 6B illustrates a second image having a second context (e.g., a stop light on green). Through training, the neural network models of the sensor system may be able to identify particular types of objects, wherein the presence or absence of these types of objects will affect the intents associated with other objects in the image. These may include stop lights (e.g., as illustrated in FIG. 6) or crossing signals, other traffic indicators such as signs and markers, particular types of people or vehicles, terrain features, and/or the like.

For example, as illustrated in FIG. 6A, when the stop light 604 is visible in the image 602a and has a red light, the sensor system may determine that the person 606a likely intends to cross the road (e.g., due to traffic needing to stop). On the other hand, in FIG. 6B, even though the current position of pose of the person 606b within the image 602b may be the same or similar to that of the person 606a within the image 602a of FIG. 6A, the sensor system may determine that the person 606b likely does not intent to cross the road, due to the stop light 604 being green. The models of the sensor system are trained with training data that includes different combination of objects and conditions, in order to determine what types of objects affect the global context of received images.

In some embodiments, the intent of objects within the image may be based upon the relative positions of objects within the image 402. For example, people within an image having similar poses may be determined to have different intents based upon different distances to the boundary of the road (e.g., a first person closer to the road may be determined to have an intent more likely to cross the road in comparison to a second person who is farther away from the road). In some embodiments, intents of two or more objects may be based upon a relationship between the objects. The relationship may be a complementary relationship or an inverse relationship. For example, the models of the sensor system may be able to determine that two people within a series of images are walking together (e.g., a parent and child). As such, if the intent of one of the people changes, the change may also be reflected in the intent of the other person. On the other hand, a series of images may contain a person and a vehicle having an inverse relationship. For example, the person may be determined to be less likely to want to cross the street if the vehicle is determined to have an intent to move along the street, and vice versa. The models of the sensor system may be trained on a training set that includes different combinations of different objects, allowing the model to identify when relationships exist between certain objects and how it effects the intents of the objects.

Figure 7:
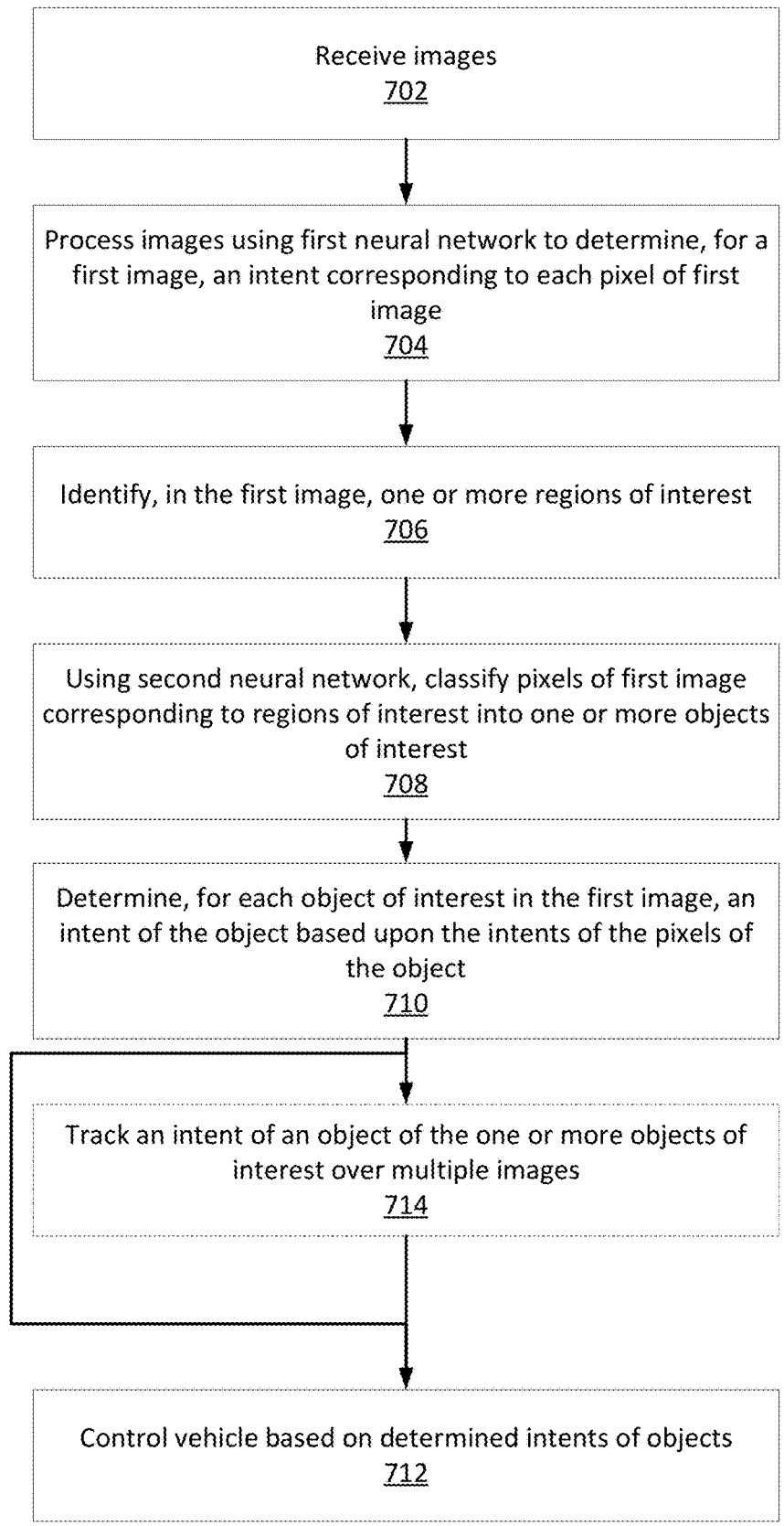
FIG. 7 is a flowchart of a process for predicting intent of objects present in a local area of a vehicle, in order to control behavior of the vehicle, in accordance with some embodiments of the present disclosure.

FIG. 7 is a flowchart of a process for predicting intent of objects present in a local area of a vehicle, in order to control behavior of the vehicle, in accordance with some embodiments. The process of FIG. 7 may be performed by a sensor system of a vehicle (e.g., the sensor system illustrated in FIG. 3).

The sensor system receives 702 one or more images corresponding to captured sensor data. In some embodiments, the images may correspond to frames of video data. In some embodiments, the images may contain depth data indicating the depth associated with corresponding pixels of the image.

The sensor system processes 704 the images using a first neural network model to determine, for a first image, a feature vector indicating intent for each pixel of the first image. Each feature vector indicates an intent of the corresponding pixel, corresponding to whether the pixel of the first image is part of an object with an intent to perform a certain action (e.g., cross the street). Because the first neural network model generates a feature vector for each pixel, this is referred to as a bottom-up analysis, and may be performed in constant time. The collection of feature vectors for each pixel of the first image may be referred to as a feature map for the first image.

The sensor system identifies 706 one or more regions of interest of the first image, based upon the feature map. The regions of interest may correspond to regions of the first image containing pixels corresponding to feature vectors of interest (e.g., feature vectors indicating an intent to cross the street).

The sensor system uses 708 a second neural network model to classify the pixels of the first image corresponding to the identified regions of interest into one or more objects. In some embodiments, the second neural network performs region pooling to identify one or more bounding boxes corresponding to objects within the regions of interest.

The sensor system determines 710, for each identified object of interest, an intent of the object, based upon the feature vectors of the pixels of the object. In some embodiments, the intent of the object is expressed as an overall feature vector for the object corresponding to an aggregation of at least a portion of the feature vectors of the pixels of the object. In some embodiments, the intent of the object may be adjusted based upon relationships of other identified objects, or based upon a context of the image (e.g., the presence or absence of certain types of objects). The overall feature vector associated with the object may represent a prediction of an action to be performed by the object.

The sensor system generates 712 one or more commands to control the vehicle, based upon the determined intents of the objects. For example, the sensor system may, in response to determining that at least one object in the first image has an intent to cross the street, generate a command for the vehicle to slow down or stop. On the other hand, if no objects in the first image exhibit at least a threshold intent to cross the street, the sensor system may generate a command allowing the vehicle to continue on its current course.

In addition, in some embodiments, the sensor system may track 714 one or more identified objects of the first image over one or more subsequent frames. For example, the sensor system may track a position and intent of an object across multiple image frames. In some embodiments, the sensor system may update or adjust a determined intent for an object based upon a position or intent of the object in a previous image frame. The sensor system may the use the determined intents to generate commands to control the vehicle (e.g., at 712).

Additional Considerations

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device) or in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A method comprising:
   receiving a plurality of images, each image corresponding to a video frame captured by one or more sensors of a vehicle moving through traffic;
   processing the plurality of images using a first neural network model configured to generate, for a first image of the plurality of images, a first feature map indicating, for each pixel of the first image, a feature vector corresponding to an intent associated with the pixel;

using a second neural network model, identifying one or more traffic entities within the first image based upon the first image and the first feature map of the first image, wherein a traffic entity represents an object moving through the traffic;

determining, for each of the identified one or more traffic entities, an overall intent of the traffic entity, based upon an aggregation of the feature vectors corresponding to pixels encompassed by the traffic entity, wherein the overall intent represents an action that the traffic entity is expected to perform in the traffic; and generating one or more commands to control the vehicle based upon the determined overall intents of the one or more traffic entities.

2. The method of claim 1, wherein a feature vector associated with a pixel corresponds to a plurality of intents associated with the pixel, each intent associated with a predicted value representative of a statistical distribution of the intent and an uncertainty value associated with the predicted value.

3. The method of claim 1, wherein identifying the one or more traffic entities using the second neural network model, further comprises:
performing object recognition on the first image to generate a bounding box around each of the one or more traffic entities in the first image, the bounding box encompassing a plurality of pixels representative of the traffic entity.

4. The method of claim 1, wherein the overall intent of the traffic entity is based on a relationship with one or more other traffic entities in the first image.

5. The method of claim 4, wherein the relationship is based on relative positions of the traffic entity with the one or more other traffic entities in the first image.

6. The method of claim 1, wherein the overall intent of the object is based on a presence or absence of other traffic entities in the first image.

7. The method of claim 1, further comprising:
generating, using the first neural network model, a second feature map for a second image that includes a traffic entity from the one or more traffic entities within the first image, the second feature map indicating a feature vector for each pixel encompassed by the traffic entity within the second image.

8. The method of claim 7, further comprising:
identifying, using the second neural network model, the traffic entity within the second image based upon the second image and the second feature map of the second image; and
determining an updated overall intent of the traffic entity based upon the aggregation of the feature vectors corresponding to the pixels encompassed by the traffic entity within the second image.

9. A non-transitory computer readable medium storing instructions that when executed by a processor cause the processor to perform steps comprising:
receiving a plurality of images, each image corresponding to a video frame captured by one or more sensors of a vehicle moving through traffic;
processing the plurality of images using a first neural network model configured to generate, for a first image of the plurality of images, a first feature map indicating, for each pixel of the first image, a feature vector corresponding to an intent associated with the pixel;
using a second neural network model, identifying one or more traffic entities within the first image based upon the first image and the first feature map of the first image, wherein a traffic entity represents an object moving through the traffic;

determining, for each of the identified one or more traffic entities, an overall intent of the traffic entity, based upon an aggregation of the feature vectors corresponding to pixels encompassed by the traffic entity, wherein the overall intent represents an action that the traffic entity is expected to perform in the traffic; and generating one or more commands to control the vehicle based upon the determined overall intents of the one or more traffic entities.

10. The non-transitory computer readable medium of claim 9, wherein a feature vector associated with a pixel corresponds to a plurality of intents associated with the pixel, each intent associated with a predicted value representative of a statistical distribution of the intent and an uncertainty value associated with the predicted value.

11. The non-transitory computer readable medium of claim 9, wherein identifying the one or more traffic entities using the second neural network model, further comprises:
performing object recognition on the first image to generate a bounding box around each of the one or more traffic entities in the first image, the bounding box encompassing a plurality of pixels representative of the traffic entity.

12. The non-transitory computer readable medium of claim 9, wherein the overall intent of the traffic entity is based on a relationship with one or more other traffic entities in the first image.

13. The non-transitory computer readable medium of claim 12, wherein the relationship is based on relative positions of the traffic entity with the one or more other traffic entities in the first image.

14. The non-transitory computer readable medium of claim 9, wherein the overall intent of the traffic entity is based on a presence or absence of other traffic entities in the first image.

15. The non-transitory computer readable medium of claim 9, further storing instructions that cause the processor to perform the step of:
generating, using the first neural network model, a second feature map for a second image that includes a traffic entity from the one or more traffic entities within the first image, the second feature map indicating a feature vector for each pixel encompassed by the traffic entity within the second image.

16. The non-transitory computer readable medium of claim 15, further storing instructions that cause the processor to perform the steps of:
identifying, using the second neural network model, the traffic entity within the second image based upon the second image and the second feature map of the second image; and
determining an updated overall intent of the object based upon the aggregation of the feature vectors corresponding to the pixels encompassed by the traffic entity within the second image.

17. A system comprising:
a hardware processor; and
a non-transitory computer readable medium storing instructions that when executed by the hardware processor cause the processor to perform steps comprising:
receiving a plurality of images, each image corresponding to a video frame captured by one or more sensors of a vehicle moving through traffic;

processing the plurality of images using a first neural network model configured to generate, for a first image of the plurality of images, a first feature map indicating, for each pixel of the first image, a feature vector corresponding to an intent associated with the pixel;

using a second neural network model, identifying one or more traffic entities within the first image based upon the first image and the first feature map of the first image, wherein a traffic entity represents an object moving through the traffic;

determining, for each of the identified one or more traffic entities, an overall intent of the traffic entity, based upon an aggregation of the feature vectors corresponding to pixels encompassed by the traffic entity, wherein the overall intent represents an action that the traffic entity is expected to perform in the traffic; and generating one or more commands to control the vehicle based upon the determined overall intents of the one or more traffic entities.

18. The system of claim 17, wherein a feature vector associated with a pixel corresponds to a plurality of intents associated with the pixel, each intent associated with a predicted value representative of a statistical distribution of the intent and an uncertainty value associated with the predicted value.

* * * * *